(12) United States Patent (10) Patent No.: US 9,984,163 B2
Hammoud (45) Date of Patent: May 29, 2018

(54) SELF-PRESENTING REPORT

(75) Inventor: Amer Hammoud, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1210 days.

(21) Appl. No.: 13/076,796

(22) Filed: Mar. 31, 2011

(65) Prior Publication Data

US 2012/0254195 A1    Oct. 4, 2012

(51) Int. Cl.
*G06F 17/30* (2006.01)

(52) U.S. Cl.
CPC .............. *G06F 17/30867* (2013.01)

(58) Field of Classification Search
CPC .... G06F 17/211; G06F 17/212; G06F 17/217; G06F 17/30867
USPC ........................................................ 707/748
See application file for complete search history.

(56) References Cited

U.S. PATENT DOCUMENTS

| | | | |
|---|---|---|---|
| 5,742,517 A * | 4/1998 | Van Den Bosch | 382/141 |
| 7,293,031 B1 * | 11/2007 | Dusker et al. | |
| 7,388,978 B2 * | 6/2008 | Duvdevani et al. | 382/145 |
| 7,707,040 B2 | 4/2010 | Lakhotia et al. | |
| 7,844,892 B2 | 11/2010 | Shewchenko et al. | |
| 2002/0131625 A1 * | 9/2002 | Vining et al. | 382/128 |
| 2003/0187716 A1 * | 10/2003 | Lee | G06Q 10/06315 705/7.25 |
| 2007/0003119 A1 * | 1/2007 | Roehrig | G06T 19/00 705/3 |
| 2007/0203915 A1 | 8/2007 | McCully | |
| 2007/0299860 A1 | 12/2007 | Westman et al. | |
| 2008/0046805 A1 * | 2/2008 | Shewchenko | G06F 17/30572 707/999.001 |
| 2008/0167981 A1 * | 7/2008 | Whitehurst et al. | 705/37 |
| 2008/0184099 A1 * | 7/2008 | Tien | G06F 17/21 715/209 |
| 2009/0076845 A1 * | 3/2009 | Bellin et al. | 705/2 |
| 2010/0161471 A1 * | 6/2010 | Fendick | G06Q 40/00 715/854 |
| 2010/0161510 A1 * | 6/2010 | Nilsson | G06Q 40/06 705/36 R |
| 2010/0175019 A1 | 7/2010 | Sitton et al. | |
| 2010/0211895 A1 | 8/2010 | Mistry et al. | |
| 2011/0019887 A1 * | 1/2011 | Roehrig | G06F 19/321 715/781 |

OTHER PUBLICATIONS

Microsoft Office Online, "Create and distribute a self-running PowerPoint presentation," Mar. 14, 2010; retrieved Jul. 22, 2016, pp. 1-4.*

(Continued)

*Primary Examiner* — Ashish Thomas
*Assistant Examiner* — Jedidiah P Ferrer
(74) *Attorney, Agent, or Firm* — Shumaker & Sieffert, P.A.

(57) ABSTRACT

A method, system and computer program product may identify information of interest to form identified points of interest using a report specification, create a master detail relationship using the identified points of interest, apply an order to the identified points of interest, apply annotations to the identified points of interest, apply highlighting to the identified points of interest, generate an enhanced report specification based on at least the order, annotations, or highlighting of the identified points of interest, and execute the enhanced report specification.

17 Claims, 11 Drawing Sheets

(56) References Cited

OTHER PUBLICATIONS

WebFOCUS InfoAssist Robust and Intuitive Ad Hoc Query, Reporting, and Cube Browsing for Business Users, Information Builders, URL: http://www.informationbuilders.com/products/webfocus/pdf/Info_AssistFS.pdf (4 pages) (printed Dec. 23, 2010).

Mary ellen Foster, "Automatically Generating Text to Accompany Information Graphics," thesis submitted (119 pages) (1999).

Henrike Berthold et al., "An Architecture for Ad-hoc and Collaborative Business Intelligence," URL:http://www.edbt.org/Proceedings/2010-Lausanne/workshops/beweb/papers/edbt_2010_submission_565.pdf (6 pages) (Mar. 2010).

Christopher J. Matheus et al., "An Application of KEFIR to the Analysis of Healthcare Information," In KDD-94: AAAI-94 Knowledge Discovery in Database Workshop (11 pages) (printed Dec. 23, 2010).

* cited by examiner

SELF-PRESENTING REPORT

BACKGROUND

This disclosure relates generally to report generation in a data processing system and more specifically to generation of self-presenting reports in the data processing system. Reports generated using business intelligence processing have typically become richer in information and more complex over time. As a result of the improvement in reporting, reading the reports could represent a challenging task for users, especially for laymen, mobile media users and those who are accessibility challenged.

Methods currently in use for presenting data in reports vary, including charts, visualization schemes, conditional rendering of data, dynamic trending, dynamic reporting enabling a user to filter and view data from different perspectives, and statistical analysis. However useful current techniques are for enabling the presentation of data contained in reports, effort is still required to traverse the findings presented in a report to identify items of interest, especially in the case of a layman.

BRIEF SUMMARY

According to embodiments of the invention, methods, systems and computer program products receive a report specification, identify information of interest to form identified points of interest using the report specification, create a master detail relationship using the identified points of interest, apply an order to the identified points of interest, apply annotations to the identified points of interest, apply highlighting to the identified points of interest, generate an enhanced report specification based on at least the order, annotations, or highlighting of the identified points of interest and execute the enhanced report specification.

BRIEF DESCRIPTION OF THE SEVERAL VIEWS OF THE DRAWINGS

For a more complete understanding of embodiments of this invention, reference is now made to the following brief description, taken in conjunction with the accompanying drawings and detailed description, wherein like reference numerals represent like parts.

DETAILED DESCRIPTION

Figure 1:
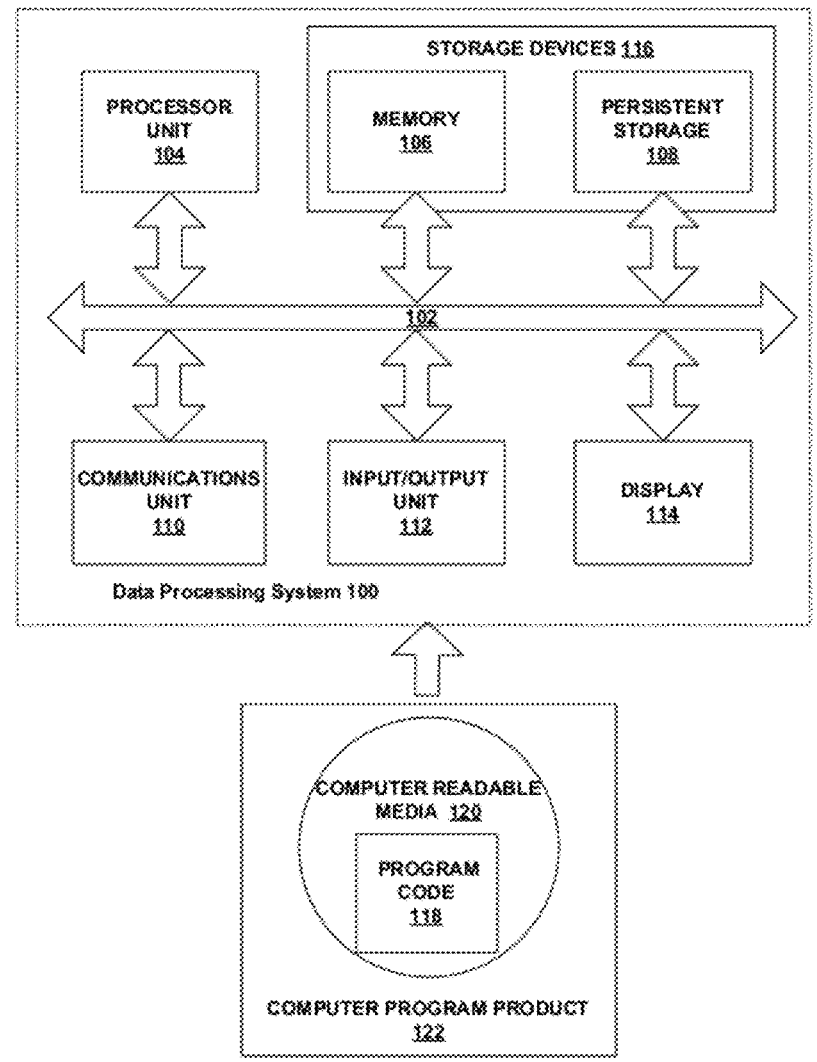
FIG. 1 is a block diagram of an exemplary data processing system operable for various embodiments of the invention.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present invention may be written in any combination of one or more programming languages, including an object oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational acts to be performed on the computer or other programmable apparatus to produce a computer-implemented method such that the instructions which execute on the computer or other programmable apparatus provide methods for implementing the functions/acts specified in the flowchart and/or block diagram block or blocks.

In some examples, screen readers for the accessibility challenged, for example, Job Access With Speech (JAWS) (available at www.freedomscientific.com/), do not enhance the processing of data used in report results, since the screen readers typically read reports converting text to speech with minimal processing. Mobile formats for reports are typically miniature representations of desktop equivalents. Mobile formats typically do not cater to the requirements of a mobile user; rather the focus is on device support. There is, therefore, a need to simplify the presentation process of findings in reports that caters to every medium and every end user without sacrificing the richness of reports.

Turning now to FIG. 1 a block diagram of an exemplary data processing system operable for various embodiments of the invention is presented. In this illustrative example, data processing system 100 includes communications bus 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications bus 102. In these illustrative examples the instructions are in a functional form on persistent storage 108. These instructions may be loaded into memory 106 for execution by processor unit 104. The methods of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications bus 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications bus 102.

Using data processing system 100 of FIG. 1 as an example, an illustrative embodiment provides the computer-implemented method stored in memory 106, executed by processor unit 104, for a self-presenting report. Processor unit 104 receives a report specification from communications unit 110, storage devices 116, input/output unit 112 or display 114. Processor unit 104 identifies information of interest to form identified points of interest using the report specification, creates a master detail relationship using the identified points of interest, applies an order to the identified points of interest, applies annotations to the identified points of interest, and applies highlighting to the identified points of interest. Processor unit 104 generates an enhanced report specification, executes the enhanced report specification and generates a self-presenting report using a selected output format. The self-presenting report may be presented on display 114, stored in storage devices 116 or transmitted to a remote system or user using communications unit 110.

In an alternative embodiment, program code 118 containing the computer-implemented method may be stored within computer readable media 120 as computer program product 122. In another illustrative embodiment, the method for the self-presenting report may be implemented in a system comprising a communications bus, a memory connected to the communications bus, wherein the memory contains computer executable program code, a communications unit connected to the communications bus, an input/output unit connected to the communications bus, a display connected to the communications bus, and a processor unit connected to the communications bus. The processor unit of the system executes the computer executable program code to direct the system to perform the method.

Figure 2:
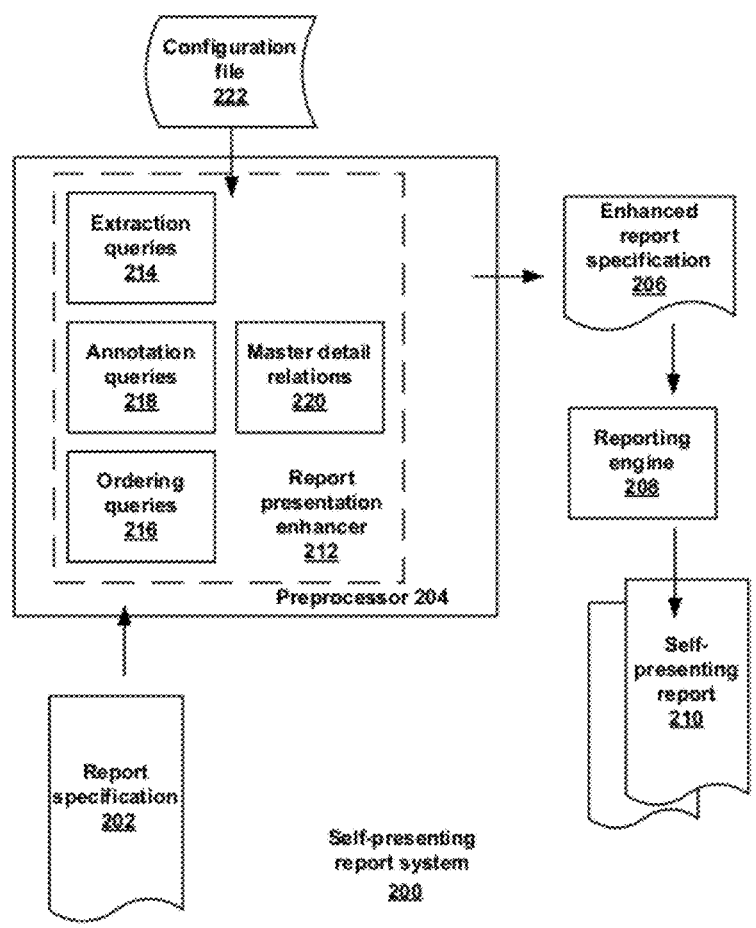
FIG. 2 is a block diagram of a self-presenting report system in accordance with various embodiments of the invention.

With reference to FIG. 2 a block diagram of a self-presenting report system in accordance with various embodiments of the invention is presented. Self-presenting report system 200 is an example of an illustrative embodiment of a self-report generating and display system.

Self-presenting report system 200 comprises a number of components built on a foundation of a typical business intelligence reporting system providing a capability to consume report specification 202. Preprocessor 204 provides additional capabilities of generating a self-presenting report from the input of report specification 202.

Preprocessor 204 comprises components of report presentation enhancer 212 which uses information from configuration file 222 to control and modify report specification 202 during processing. For example, configuration file 222 contains specifications for exception reporting, preferences including ordering specifications and animation elements. Components of report presentation enhancer 212 include extraction queries 214, ordering queries 216, annotation queries 218 and master detail relations 220. Preprocessor 204 processes report specification 202 into enhanced report specification 206. The enhancements provide addition instructions for report data filtering and presentation processed by reporting engine 208 to generate self-presenting report 210. Reporting engine 208 is a typical business intelligence reporting engine capable of processing report specifications as input.

Report presentation enhancer 212 built on top of a typical reporting system injects extraction, ordering and annotation elements into report specification 202. Preprocessor 204 working through report presentation enhancer 212 provides a capability for extraction queries 214, ordering queries 216, annotation queries 218 to generate extra fields in report specification 202 with corresponding query items. Extraction queries 214, ordering queries 216, annotation queries 218 are responsible for extracting, annotating and ordering hidden data of the report, by utilizing the normal assembly and rendering mechanisms of reporting engine 208 through injected fields. The injected fields are located within layers of the report specification capable of being conditionally displayed in the self-presenting report.

Extraction queries 214, ordering queries 216, and annotation queries 218 injects fields on special layers, within an enhanced report specification that are conditionally displayed or hidden from final output to avoid cluttering the output. The injected query items consist of expressions using typical reporting query expressions with a capability of additional specially tailored query expressions.

Results provide by extraction queries 214, ordering queries 216, annotation queries 218 derive enhanced report specification 206 in a master detail relationship using master detail relations 220 enabling a user to page through findings of the report in a predetermined order of importance. Enhanced report specification 206 is processed through reporting engine 208, as other typical reports creating self-presenting report 210 suitable as input for a report viewer, or saved as a software presentation application specific file. Master detail relations 220 provide specification of associations between master topics and sub-topics. For example, a product summary may provide a master list of products whereas a sub-topic provides a specific member item in the list. The relationship defined in master detail relations 220 maintains an affinity between elements in an element hierarchy to ensure sub-topic elements are presented in a context of master elements.

Self-presenting report 210 enables paging through the presentation sequentially in a predetermined order using a selectable method. For example, using one possible method shifts focus to certain aspects of the report, target of annotation, through highlighting, annotation and target of annotation embedded in the report. In another example, re-executing enhanced report specification 206 through reporting engine 208 filters out data associated with an active target of annotation. In another example audible output results from processing annotations in order of classification.

Self-presenting report 210 output is provided in a form of static multi-paged with one section or slide per annotation, similar to a software presentation application file as stated earlier. Another form of output is provided as a single-paged version with on-demand generation of each slide related to an active annotation. Output format is either hypertext markup language or as software presentation application specific file format consisting of a series of slides, each slide focusing on one active annotation at a time.

Animations are utilized to indicate trends or marked differences and relations. Animated pointers are designed to focus on a point of active annotation. Differences are shown using animation including flashing and moving between several locations.

Using self-presenting report system 200, a standard report is programmatically converted into a self-presenting report enabling a sequential walk through the findings, or points of interest, in the report in predetermined order of importance The predetermined order of importance is determined by criteria set by an author or end user. The criteria could be any criteria describing the data that would distinguish data points, for example, one data point from another data point or from a group, through simple comparisons. Criteria are contained in a configuration file, or added on the fly.

An illustrative embodiment of self-presenting report system 200 generates self-presenting reports by programmatically modifying a report specification, adding capabilities to the original specification, enabling a user to switch between two viewing modes in which one is normal and the other is a presentation mode, utilizing an existing business intelligence reporting engine and system. A report viewer enables switching between the standard (normal) report viewing mode and a sequential presentation mode on command, for example upon selection of a 'walkthrough' button in a user interface. Illustrative embodiments typically enable the reports to be readily portable to mobile mediums and accessible by challenged viewers.

Another embodiment, for example, uses objects in the report such as chart objects, list objects and crosstab objects that have a configurable self-present attribute. The self-present attribute is set by a report author, or through a configuration file enabling the objects to self-present content whenever the report is rendered. A report viewer may activate the presentation of object content by selection of the object. In another example of a control, an object may provide a slider control enabling the viewer to progressively slide through a series of points of interest in the object. In a similar manner an object containing a multimedia presentation may be invoked and scrolled through when activated. Using this style of embodiment an object contains the controls and information rather than having the controls and information explicitly placed in the report.

Figure 3:
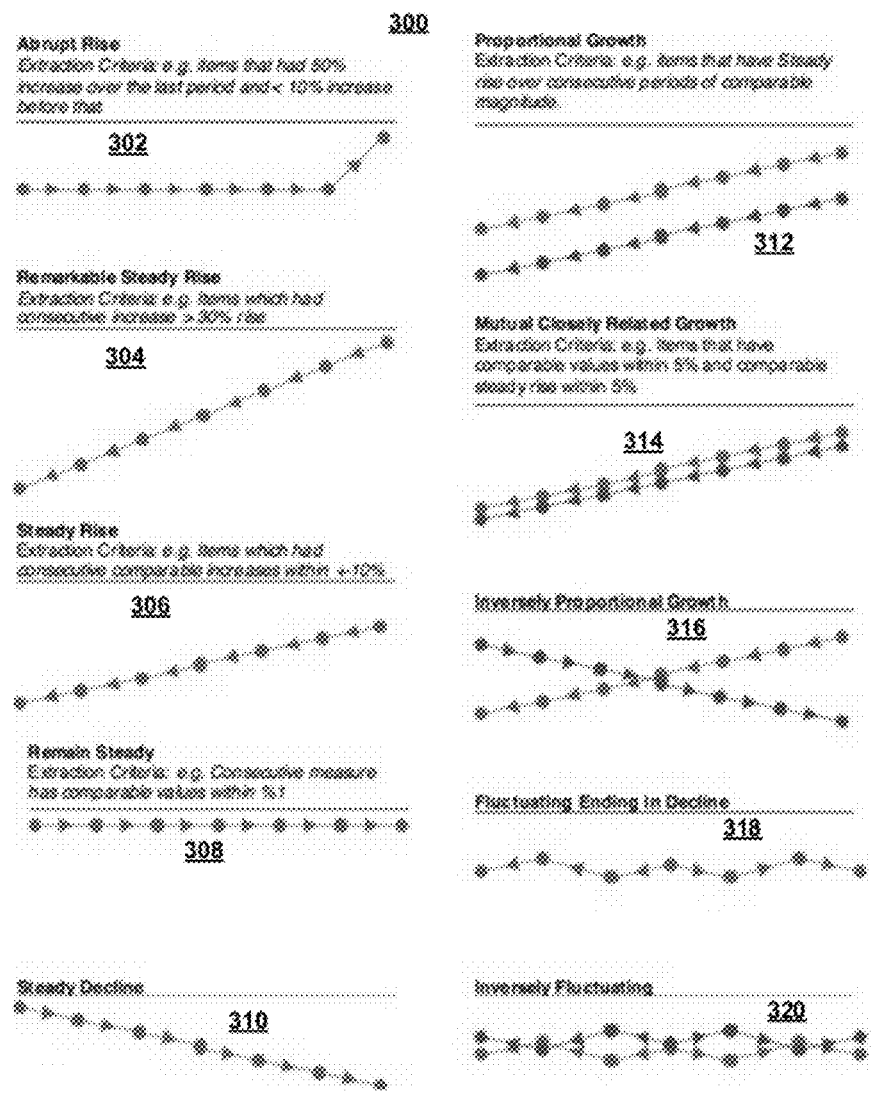
FIG. 3 is a sample representation of extraction criteria used in the self-presenting report system of FIG. 2, in accordance with one embodiment of the invention.

With reference to FIG. 3 a sample representation of extraction criteria used in the self-presenting report system of FIG. 2, in accordance with one embodiment of the invention is presented. Extraction criteria 300 are an example of criteria maintained in configuration file 222.

Sample 302 is an example of a combination of conditions over a number of time periods. In this example, two numeric conditions may be met over two adjacent time periods.

Sample 304 is an example of a single numeric condition over a number of time periods. In this example, a numeric condition may be exceeded over consecutive time periods.

Sample 306 is an example of a single condition over a number of time periods. In this example, a numeric condition specified as a range may be met over adjacent time periods.

Sample 308 is an example of a single condition over a number of time periods. In this example, a numeric condition specified as tight variance may be met over adjacent time periods.

Sample 310 is an example of a single condition over a number of time periods. In this example, a numeric condition is specified, as a declining function may be met over adjacent time periods.

Sample 312 is an example of a single condition over a number of time periods. In this example, a condition specified as parallel to an existing set of values may be met over adjacent time periods.

Sample 314 is an example of a combination condition over a number of time periods. In this example, one numeric condition specifies comparable values while another condition specifies comparable growth, with both conditions including a tolerance range that may not be exceeded over consecutive time periods.

Sample 316 is an example of a single condition over a number of time periods. In this example, a numeric condition specified as inversely proportional growth may be met over adjacent time periods.

Sample 318 is an example of a single condition over a number of time periods. In this example, a numeric condition specified as fluctuating set of values with a declining end portion may be met over adjacent time periods.

Sample 320 is an example of a combination condition over a number of time periods. In this example, a numeric condition is specified as an inversely fluctuating function may be met over adjacent time periods.

The various samples can be specified using extraction queries 214, ordering queries 216, annotation queries 218 of self-presenting report system 200 of FIG. 2.

Figure 4:
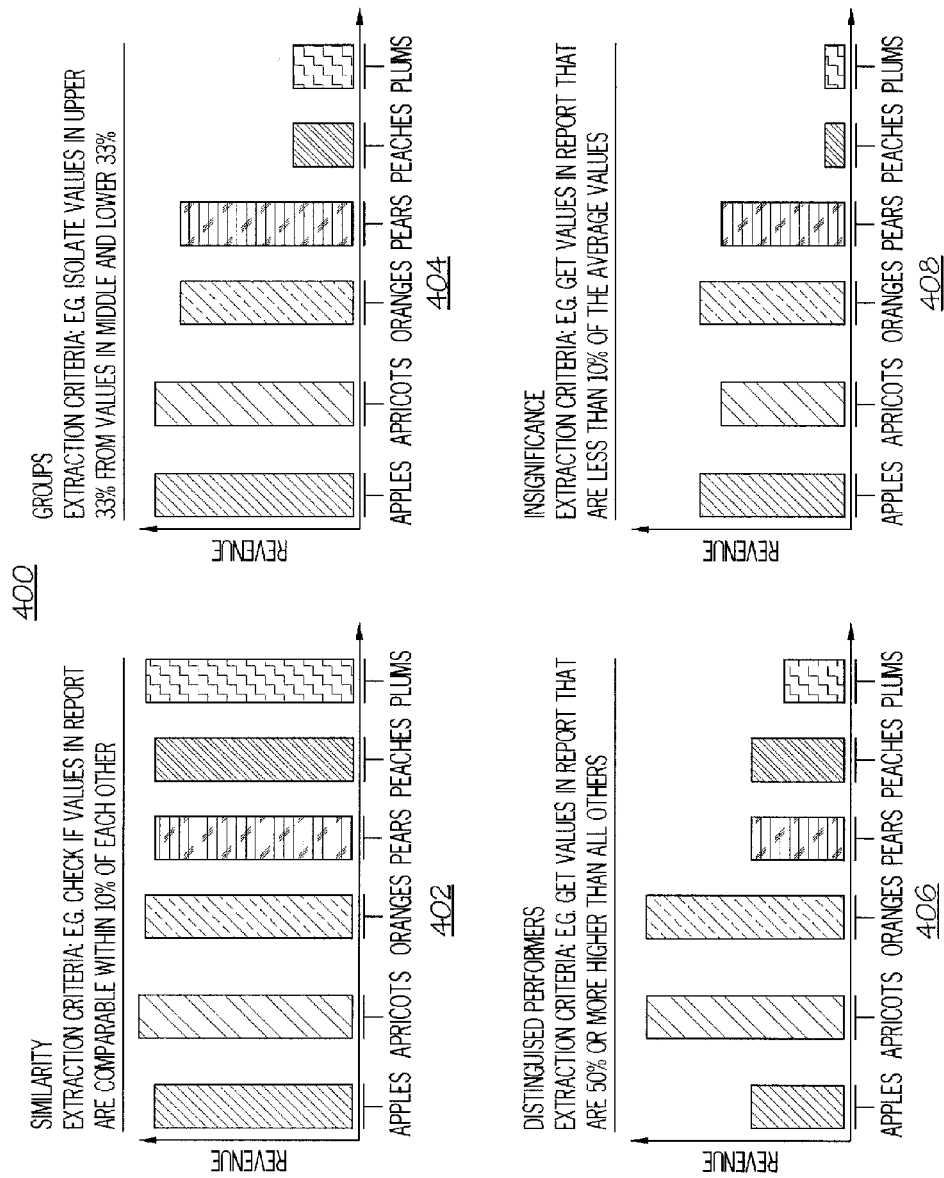
FIG. 4 is a sample representation of extraction criteria used in the self-presenting report system of FIG. 2, in accordance with one embodiment of the invention.
Figure 5A:
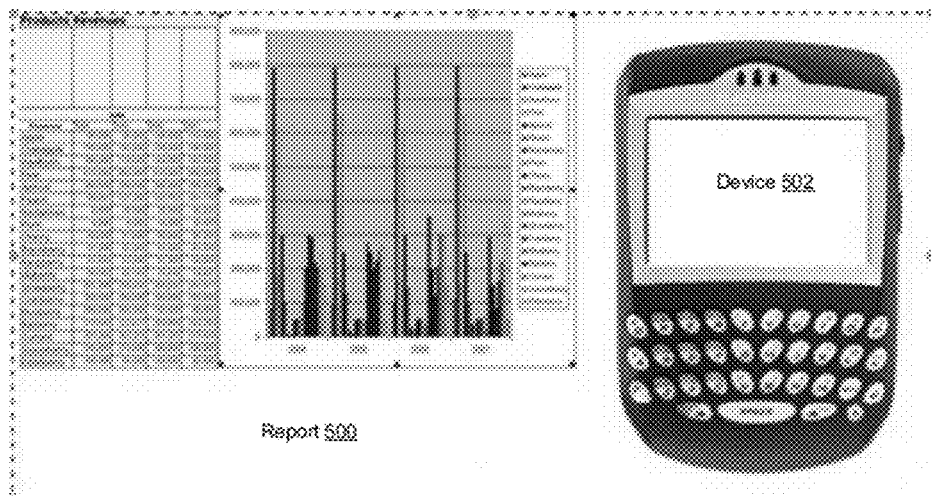
FIGS. 5-9 are pictorial representations of example self-presenting report pages, in accordance with one embodiment of the invention.
Figure 5B:
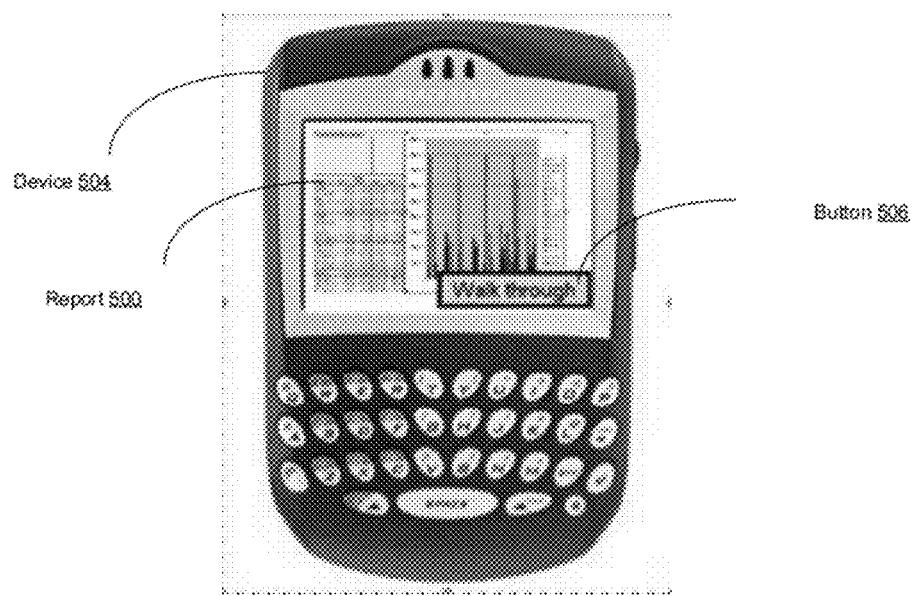

With reference to FIG. 4 a representation of sample extraction criteria used in the self-presenting report system of FIG. 2, in accordance with one embodiment of the invention is presented. Criteria 400 are examples of chart based extraction criteria capable of use with extraction queries 214, ordering queries 216, annotation queries 218 of self-presenting report system 200 of FIG. 2.

Sample 402 is an example of a similarity condition with respect to a number of elements. In this example, report values are checked to determine whether the values are comparable and within a tolerance range.

Sample 404 is an example of a grouping condition. In this example, a grouping is specified to capture elements into three groups according to element values.

Sample 406 is an example of a single condition specifying a difference. In this example, a numeric condition specifies comparable values are distinguished by exceeding a threshold.

Sample 408 is an example of a variance condition based on an average value. In this example, a tolerance range about an average is specified. This is another example of filtering or grouping.

With reference to FIGS. 5-9 a series of pictorial representations of examples of self-presenting report pages, in accordance with one embodiment of the invention is presented. With reference to FIGS. 5A, 5B, examples of a typical report derived from business intelligence report generation are provided in report 500. However a user wishes to view the report information on a handheld device, such as device 502, which is a BlackBerry® smartphone. Previous solutions typically attempted to squeeze the report material into the presentation space of the device. Report 500 is shown in a reduced size within the presentation display area of device 504 with button 506. Button 506 indicates an embodiment of a self-presenting report exists. The enhanced report capability is indicated by the presence of the walk through label on button 506. Button 506 as one example enables the user to change the presentation mode of the enhanced self-presenting report.

Figure 6A:
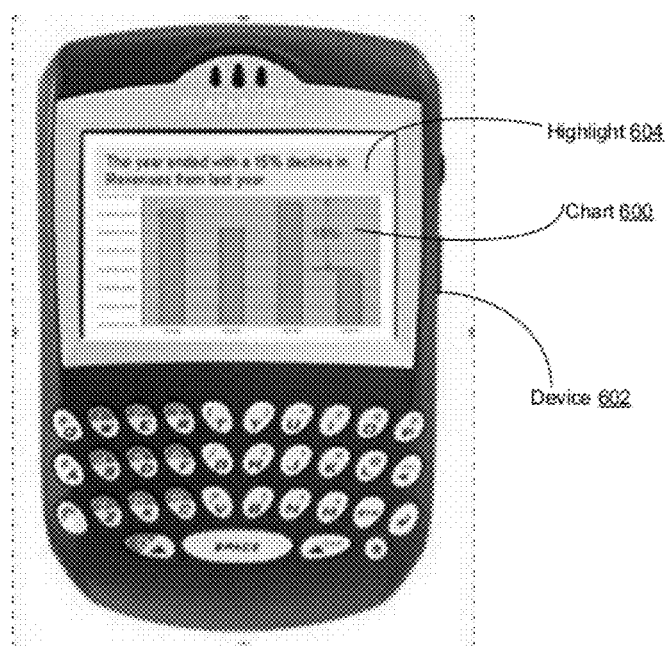
Figure 6B:
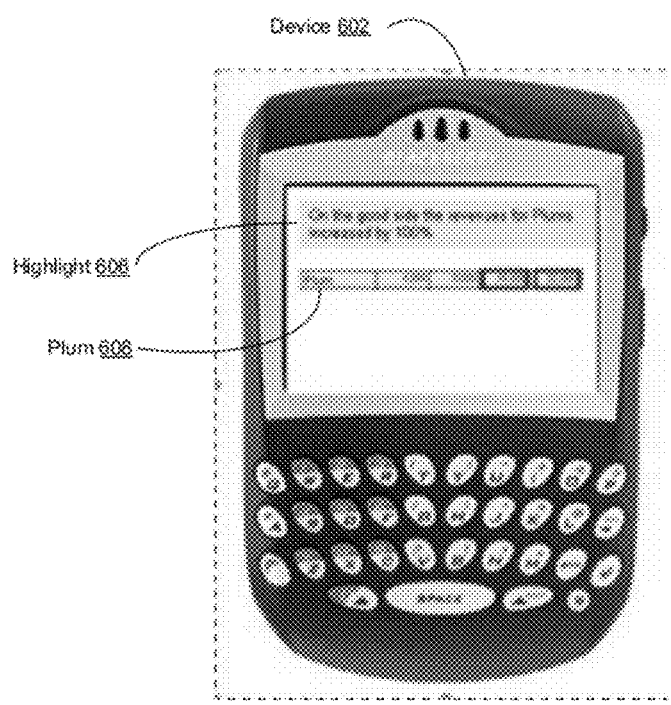

With reference to FIGS. 6A, 6B, examples of pages of a self-presenting report of FIG. 5 in accordance with one embodiment of the invention are presented. Chart 600 is an example of a page of self-presenting report displaying chart graphic and textual information associated with report 500 of FIG. 5.

Chart 600 is displayed within a presentation display area of device 602. A textual portion, highlight 604, is also displayed on the presentation display area of device 602. Highlight 604 represents an active annotation derived from the traditional information generated for report 500 of FIG. 5. The textual information describes the information in chart 600, which is further enhanced by a graphic (possibly animated) illustrating a fifteen percent difference between adjacent bars in the chart.

In another example, plum 608 is displayed on device 602. Plum 608 is a line item from the products of report 500 of FIG. 5. Highlight 606 provides textual information describing the increased revenue attributed to the displayed line item of plum 608.

The examples illustrate the capability to display granular detail not evident in the initial presentation of report 500 on device 502 of FIG. 5. The walkthrough capability enables a user to focus on detail information without confusion caused by squeezing too much information into a small presentation space.

Figure 7A:
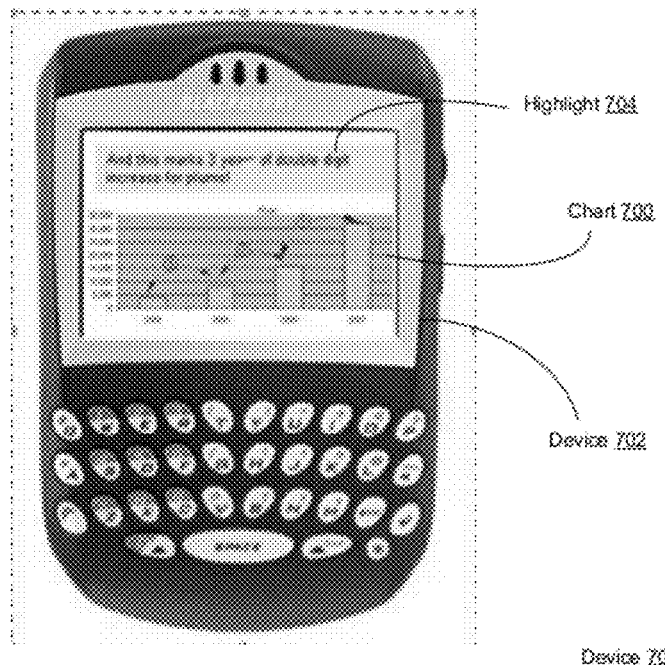
Figure 7B:
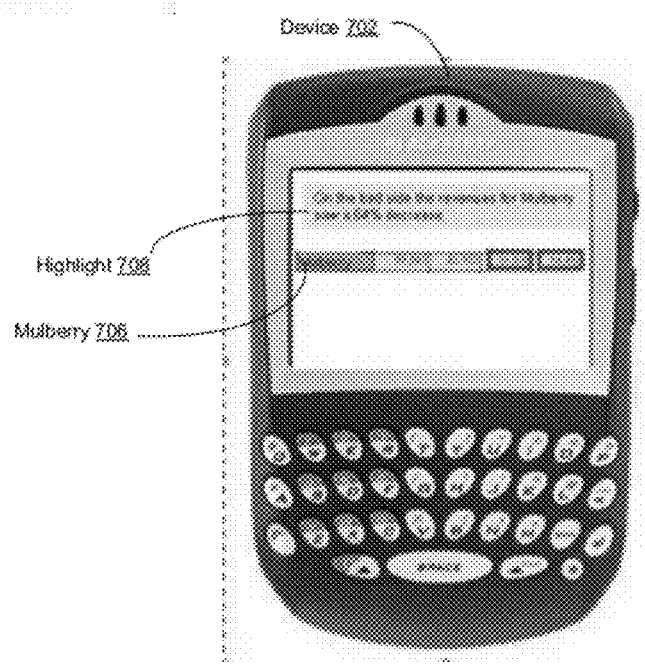

With reference to FIGS. 7A, 7B, examples of pages of a self-presenting report of FIG. 5 in accordance with one embodiment of the invention are presented. Chart 700 is an example of a page of self-presenting report displaying chart graphic and textual information associated with report 500 of FIG. 5.

Chart 700 is displayed within a presentation display area of device 702. A textual portion, highlight 704, is also displayed on the presentation display area of device 702. Highlight 704 represents an active annotation derived from the traditional information generated for report 500 of FIG. 5. The textual information describes the information in chart 700, which is further enhanced by a graphic (possibly animated) illustrating an increase in amounts between adjacent bars in the chart. In this example, an increase for plums, previously featured in plum 608 of FIG. 6 is highlighted as a chart view.

In another example, mulberry 706 is displayed on device 702. Mulberry 706 is another line item from the products of report 500 of FIG. 5. Highlight 708 provides textual information describing decreased revenue attributed to the displayed line item of mulberry 706. Mulberry 706, for example was selected as an example of exception reporting (point of interest) using extraction queries 214, ordering queries 216, annotation queries 218 of self-presenting report system 200 of FIG. 2.

Figures 8A, 8B:
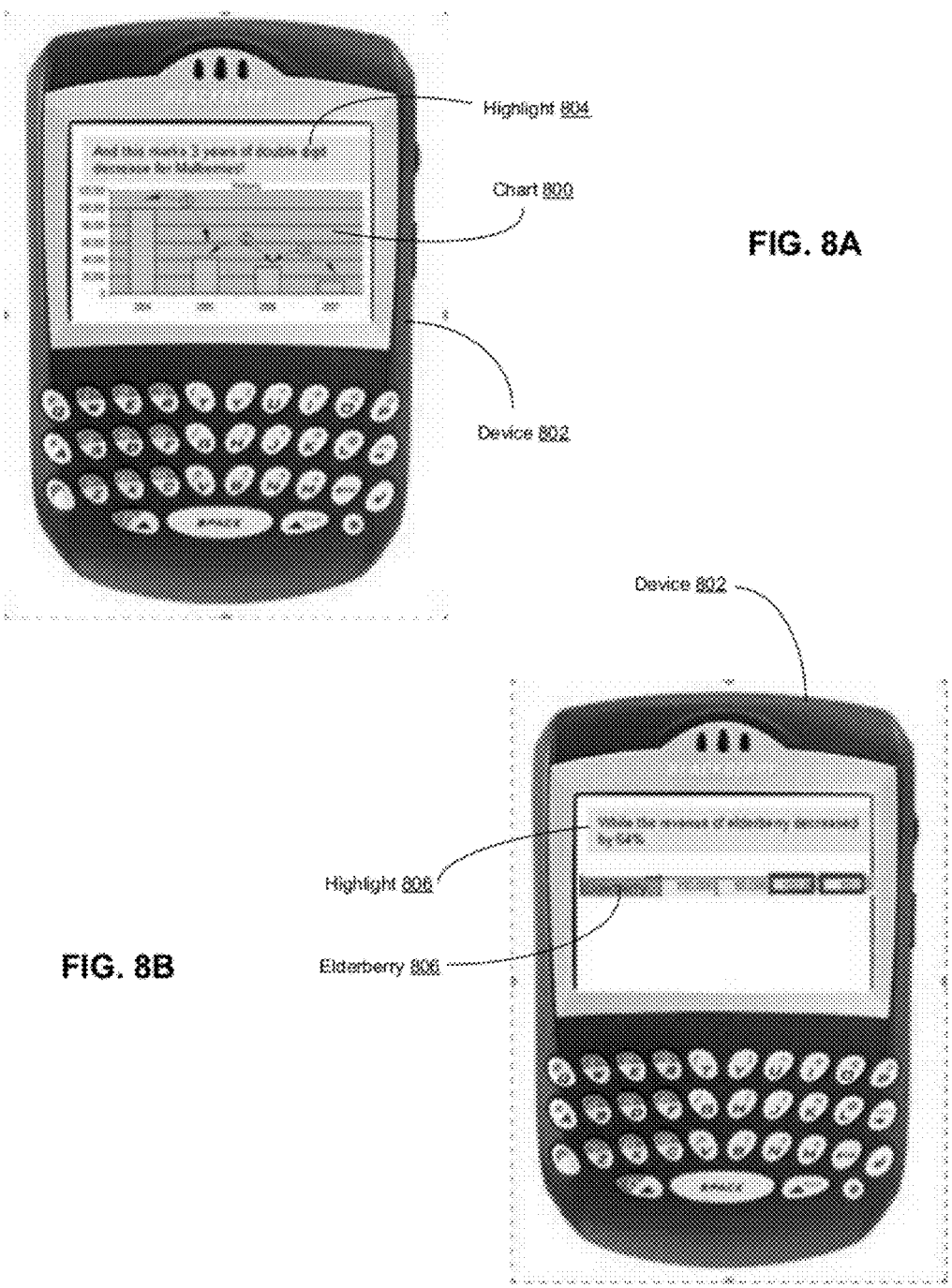

With reference to FIGS. 8A, 8B, examples of pages of a self-presenting report of FIG. 5 in accordance with one embodiment of the invention are presented. Chart 800 is an example of a page of self-presenting report displaying chart graphic and textual information associated with report 500 of FIG. 5.

Chart 800 is displayed within a presentation display area of device 802. A textual portion, highlight 804, is also displayed on the presentation display area of device 802. Highlight 804 represents an active annotation derived from the traditional information generated for report 500 of FIG. 5. The textual information describes the information in chart 800, which is further enhanced by a graphic (possibly animated) illustrating a decrease in amounts between adjacent bars in the chart for the product Mulberries. In this example, a decrease for mulberries, previously featured in mulberry 706 of FIG. 7 is highlighted as a chart view.

In another example, elderberry 806 is displayed on device 802. Elderberry 806 is another line item from the products of report 500 of FIG. 5. Highlight 808 provides textual information describing a decrease attributed to the displayed line item of elderberry 806. Elderberry 806, for example was perhaps selected as an example of exception reporting (point of interest) of double digit decline using extraction queries 214, ordering queries 216, annotation queries 218 of self-presenting report system 200 of FIG. 2.

Figure 9:
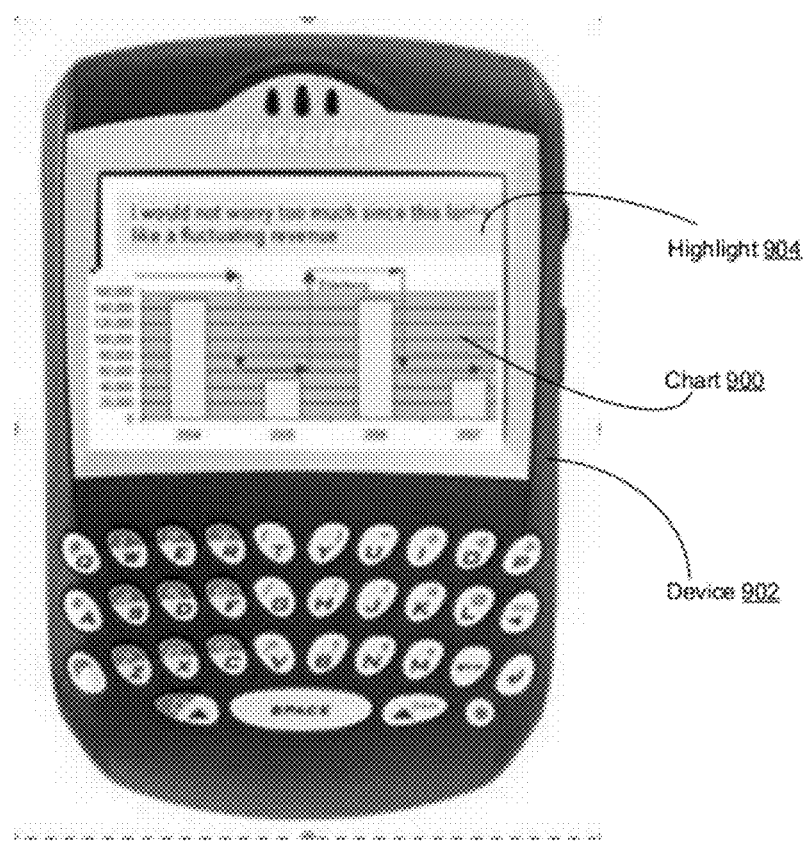

With reference to FIG. 9 an example of a page of a self-presenting report of FIG. 5 in accordance with one embodiment of the invention is presented. Chart 900 is an example of a page of self-presenting report displaying chart graphic and textual information associated with report 500 of FIG. 5.

Chart 900 is displayed within a presentation display area of device 902. A textual portion, highlight 904, is also displayed on the presentation display area of device 902. Highlight 904 represents an active annotation derived from the traditional information generated for report 500 of FIG. 5. The textual information describes the information in chart 900, which is further enhanced by a graphic (possibly animated) illustrating a fluctuating amount between adjacent bars in the chart for revenue. In this example, a fluctuation is further highlighted in the chart view using arrows. The arrows may be a further eye catcher using animation and color.

Chart 900, for example was perhaps selected as an example of exception reporting (point of interest) of a fluctuating amount using extraction queries 214, specified to satisfy fluctuating conditions or criteria to present information of self-presenting report system 200 of FIG. 2 with further specificity.

Figure 10:
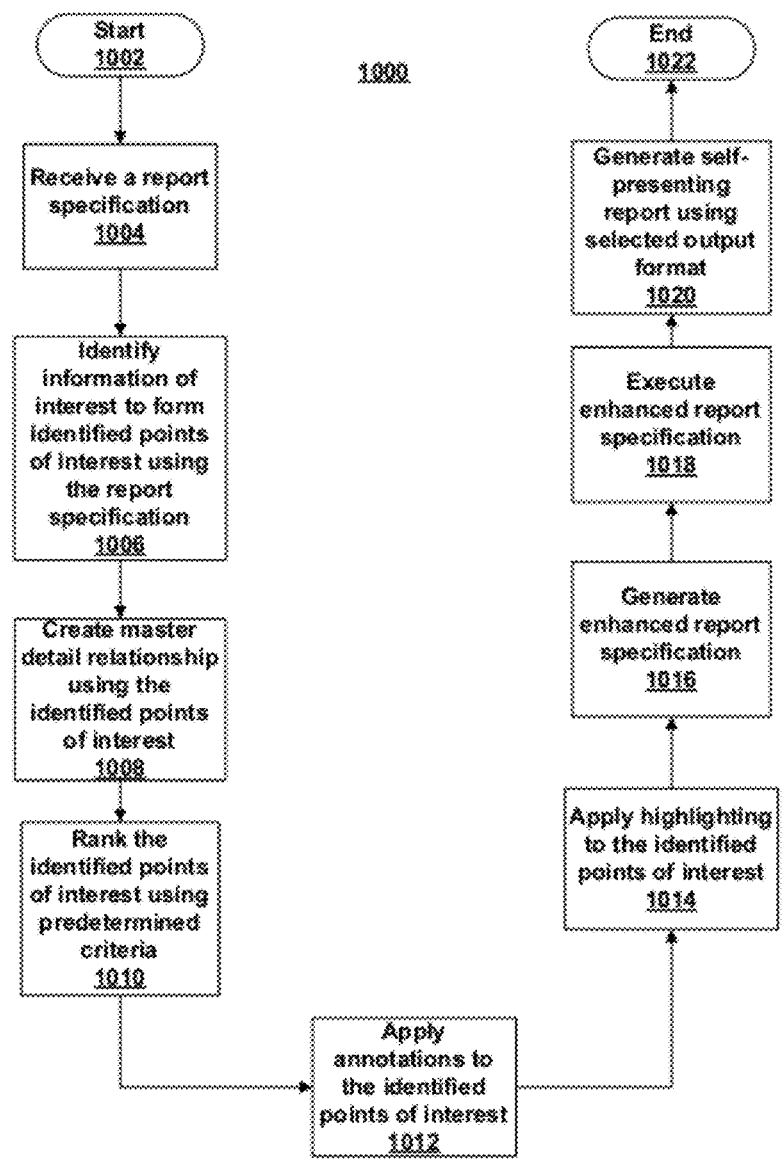
FIG. 10 is a flowchart of a method for creating a self-generating report using the self-presenting report system of FIG. 2, in accordance with one embodiment of the invention.

With reference to FIG. 10 a flowchart of a method for creating a self-generating report using the self-presenting report system of FIG. 2, in accordance with one embodiment of the invention is presented. Method 1000 is an example of a processing using the self-presenting report system 200 of FIG. 2.

Method 1000 starts (act 1002) and receives a report specification (act 1004). The report specification is a typical report specification used in a business intelligence reporting system. Method 1000 identifies information of interest to form points of interest using the report specification (act 1006). Points of interest when encountered in the report specification determine the level of granularity used and later appear in pages of the report presentation. Method 1000 creates a master detail relationship using the identified points of interest (act 1008). The master detail relationship defines an association between elements in a hierarchy of elements. For example a master may refer to a revenue chart and a detail refers to a line item in the revenue chart enabling a relationship to be defined to maintain affinity between the elements.

Method 1000 ranks the points of interest using predetermined criteria (act 1010). Predetermined criteria may be found in a data structure comprising a configuration file or may be identified dynamically from a user interface interaction. Ranking enables applying an order to the identified points of interest and presentation of the identified points of interest in a predetermined order. For example, in a sequential order commencing with highest rank items. In another example the order may be reversed. In another example ordering may request a top five items forming a set of points of interest from the identified points of interest.

Annotations are applied to the identified points of interest by method 1000 (act 1012). Method 1000 also applies highlighting to the identified points of interest (act 1014). Highlighting includes visualization to aid in visual recognition of points of interest include use of color and flashing graphics. Application of annotations is performed by annotation queries of method 1000 in combination with information resulting from extraction queries.

An enhanced report specification is generated by method 1000 (act 1016). The enhanced report specification is based on the received report specification with modifications resulting from processing of injected extraction, annotation and ordering queries using information maintained in a configuration file by the method.

Method 1000 executes the enhanced report specification (act 1018). Method 1000 uses a typical business intelligence reporting engine to process the enhanced report specification including injected fields created by extraction, annotation and ordering queries and master detail relations. Execution of the enhanced report specification by method 1000 generates a self-presenting report using a selected format (act 1020) with method 1000 terminating thereafter (act 1022). The generated self-presenting report provides a capability to selectively view the report in a typical reporting mode or in a self-presenting mode on an output device of a user. Use of the generated self-presenting report is further described.

Figure 11:
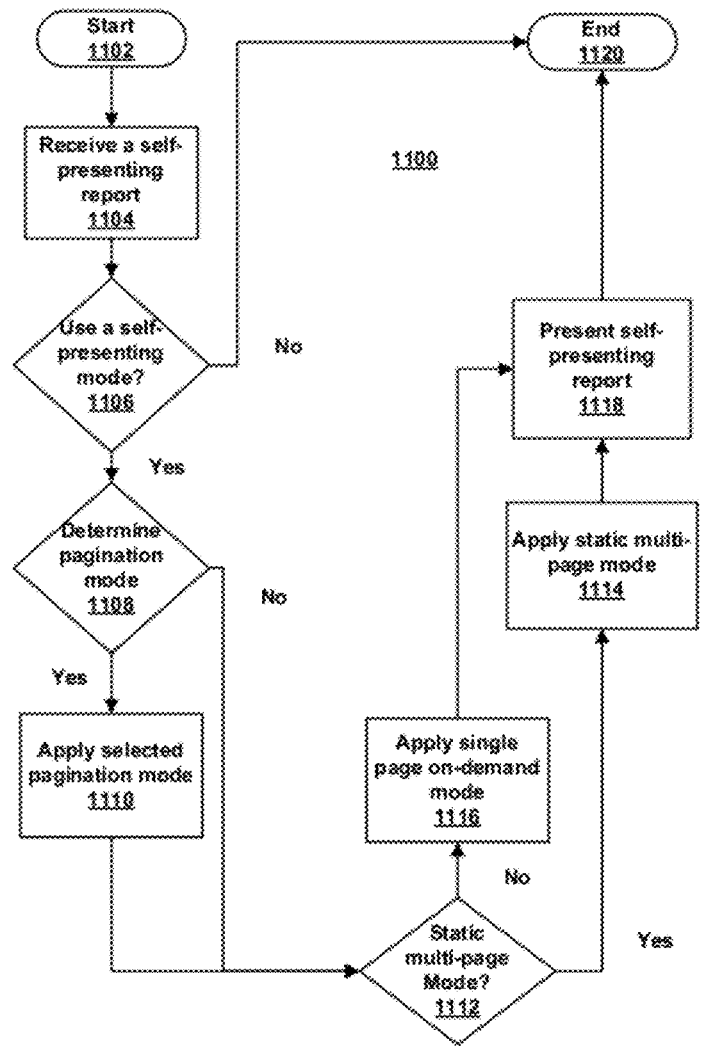
FIG. 11 is a flowchart of a method for using the self-generating report of FIG. 10, in accordance with one embodiment of the invention.

With reference to FIG. 11 a flowchart of a method for using the self-generating report of FIG. 10, in accordance with one embodiment of the invention is presented. Method 1100 is an example of a method for using a self-presenting report created using method 1000 of FIG. 10.

Method 1100 starts (act 1102) and receives a self-presenting report (act 1104). The self-presenting report is an example of a report created using the previously described method using self-presenting report system 200 of FIG. 2.

Method 1100 determines whether to use a self-presenting mode (act 1106). As previously stated a self-presenting report enables a user to determine whether to view a report in typical report mode or in self-presenting report mode. In the previous example a software control in the form of a button on a user interface provided the user with a selection capability to switch between modes. A default setting typically causes a typical report mode to operate.

Responsive to a determination to use the typical report mode, method 1100 skips ahead to termination (act 1120). Responsive to a determination to use self-presenting report mode method 1100 determines whether to use a pagination mode (act 1108). A pagination mode enables paging through a presentation using a selection of predetermined methods. For example, pagination that focuses on a certain aspect of a report such as a summary section only, pagination that filters data other than an active annotation or pagination that provides audible output of a sequence of pages according to a classification such as top five listing of products by a predetermined criteria.

Responsive to a determination to not use a pagination mode, method 1100 skips to act 1112. Responsive to a determination to use a pagination mode, method 1100 applies a selected pagination mode (act 1110). Method 1100 determines whether to use a static multi-page mode (act 1112). Use of the static multi-page mode provides a typical single page per annotation in a familiar software presentation application form. Use of a single page on-demand mode enables generation of each page related to an annotation as needed.

Responsive to a determination to use the static multi-page mode, method 1100 applies the static multi-page mode (act 1114). Responsive to a determination to not use the static multi-page mode, method 1100 applies the single page on-demand mode (act 1116). Method 1100 presents a self-presenting report using a selected mode (act 1118) with method 1100 terminating thereafter (act 1120).

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the embodiments in the form disclosed. Many modifications and variations will be apparent to those of ordinary skill in the art without departing from the scope and spirit of the embodiments of the invention. The embodiments are chosen and described in order to best explain the principles of the invention and the practical application, and to enable others of ordinary skill in the art to understand the invention for various embodiments with various modifications as are suited to the particular use contemplated.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, and other software media that may be recognized by one skilled in the art.

While embodiments the present invention have been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of embodiments of the present invention has been presented for purposes of illustration and description, and is not intended to be exhaustive or limited to the invention in the form disclosed. Many modifications and variations will be apparent to those of ordinary skill in the art. The embodiments are chosen and described in order to best explain the principles of the invention, the practical application, and to enable others of ordinary skill in the art to understand the invention for various embodiments with various modifications as are suited to the particular use contemplated.

What is claimed is:

1. A computer-implemented method comprising:
   receiving a report specification, wherein the report specification comprises a plurality of groups of values, wherein each respective group of values comprises a plurality of respective values associated with a plurality of respective line items, wherein each value in a respective group of values is associated with a respective line item, and wherein each respective line item has an associated value in at least two groups of values of the plurality of groups of values;
   for at least one line item, extracting, by a computing device and from the report specification, each respective value from the plurality of groups of values associated with the same respective line item to form a respective line item group, wherein the respective line item group comprises a plurality of values each associated with the same respective line item, and wherein each respective value of the plurality of values is from a different respective group of the groups of values;
   applying, by the computing device and to at least one line item group, an order to the respective values in the respective line item group;
   generating, by the computing device, an enhanced report specification comprising data that indicates the order applied to the respective values in the respective line item group; and
   processing the enhanced report specification that includes the at least one line item group, wherein processing the enhanced report specification comprises:
      sequentially iterating through the at least one line item group;
      displaying at least one graphical representation of each of the at least one line item groups one at a time during the sequential iterating, wherein each graphical representation depicts the respective values of the respective line items in the plurality of values of the respective line item group;
      determining textual information associated with each of the at least one graphical representations that is indicative of the value of a particular line item within the respective graphical representation, wherein the respective textual information is based at least in part on the order applied to the plurality of values of the respective line item group, and wherein the respective textual information further describes a progression of the respective plurality of values of the respective line item group by describing a difference between the value of the particular line item in the respective line item group and an immediately previous value for an immediately previous line item in the applied order for the respective line item group;
      generating a self-presenting report using a selected output format by locating injected fields within layers capable of conditionally displaying in the self-presenting report, wherein the injected fields contain objects with configurable attributes enabling the objects to self-present content controls and information; and
      displaying the respective textual information simultaneously with each of the at least one graphical representations that is indicative of the respective plurality of values of the respective line item group.

2. The computer-implemented method of claim 1, wherein extracting each respective value from the plurality of groups of values associated with the same respective line item to form the respective line item group further comprises:
   adding extraction queries into the report specification.

3. The computer-implemented method of claim 1, wherein applying, to the at least one line item group, the order to the respective values in the at least one line item group further comprises:
   injecting ordering queries into the report specification;

ranking the respective values in the at least one line item group using predetermined criteria associated with the ordering queries; and injecting fields into the enhanced report specification enabling selective ordering using the ranking.

4. The computer-implemented method of claim 1, wherein generating the enhanced report specification further comprises:

injecting a user interface control enabling selective switching between a typical report mode and a self-presenting report mode, wherein responsive to the user interface control applying a selected pagination mode.

5. The computer-implemented method of claim 1, further comprising:

generating the self-presenting report further using a selected output format, wherein generating the self-presenting report further comprises:

selecting an output format from one of a static multi-paged format and a single-paged on-demand generation of each page related to an active annotation format.

6. The computer-implemented method of claim 1, further comprising:

generating the self-presenting report further using a selected output format.

7. A computer program product for self-presenting reports, the computer program product comprising:

a non-transitory computer readable storage medium containing computer executable program code stored thereon, the computer executable program code comprising:

computer executable program code to receive a report specification, wherein the report specification comprises a plurality of groups of values, wherein each respective group of values comprises a plurality of respective values associated with a plurality of respective line items, wherein each value in a respective group of values is associated with a respective line item, and wherein each respective line item has an associated value in at least two groups of values of the plurality of groups of values;

computer executable program code to, for at least one line item, extract, from the report specification, each respective value from the plurality of groups of values associated with the same respective line item to form a respective line item group, wherein the respective line item group comprises a plurality of values each associated with the same respective line item, and wherein each respective value of the plurality of values is from a different respective group of the groups of values;

computer executable program code to apply to at least one line item group, an order to the respective values in the respective line item group;

computer executable program code to generate an enhanced report specification comprising data that indicates the order applied to the respective values in the respective line item group; and computer executable program code to the enhanced report specification that includes the at least one line item group, wherein the computer executable program code to process the enhanced report specification comprises:

computer executable program code to sequentially iterate through the at least one line item group;

computer executable program code to display at least one graphical representation of each of the at least one line item groups one at a time during the sequential iterating, wherein each graphical representation depicts the respective values of the respective line items in the plurality of values of the respective line item group;

computer executable program code to determine textual information associated with each of the at least one graphical representations that is indicative of the value of a particular line item within the respective graphical representation, wherein the respective textual information is based at least in part on the order applied to the plurality of values of the respective line item group, and wherein the respective textual information further describes a progression of the respective plurality of values of the respective line item group by describing a difference between the value of the particular line item in the respective line item group and an immediately previous value for an immediately previous line item in the applied order for the respective line item group;

computer executable code to generate a self-presenting report using a selected output format by locating injected fields within layers capable of conditionally displaying in the self-presenting report, wherein the injected fields contain objects with configurable attributes enabling the objects to self-present content controls and information; and computer executable program code to display the respective textual information simultaneously with each of the at least one graphical representations that is indicative of the respective plurality of values of the respective line item group.

8. The computer program product of claim 7, wherein computer executable program code to extract each respective value from the plurality of groups of values associated with the same respective line item to form the respective line item group further comprises:

computer executable program code to add extraction queries into the report specification.

9. The computer program product of claim 7, wherein the computer executable program code to apply to the respective values in the at least one line item group at least one of the order further comprises:

computer executable program code to inject ordering queries into the report specification;

computer executable program code to rank the respective values in the at least one line item group using predetermined criteria associated with the ordering queries; and computer executable program code to inject fields into the report specification enabling selective ordering using the ranking.

10. The computer program product of claim 7, wherein computer executable program code to generate the enhanced report specification further comprises:

computer executable program code to inject a user interface control enabling selective switching between a typical report mode and a self-presenting report mode, wherein responsive to the user interface control applying a selected pagination mode.

11. The computer program product of claim 7, further comprising:

computer executable program code to generate the self-presenting report further using a selected output format, wherein the computer executable program code to generate the self-presenting report further comprises:

computer executable program code to select an output format from one of a static multi-paged format and a single-paged on-demand generation of each page related to an active annotation format.

12. The computer program product of claim 7, wherein computer executable program code to generate the self-presenting report using a selected output format further comprises:
computer executable program code to generate the self-presenting report further using a selected output format.

13. A system comprising:
a processor unit and memory, each connected to a communications bus;
computer executable code stored in said memory, wherein the processor unit executes the computer executable program code to direct the system to:
receive a report specification, wherein the report specification comprises a plurality of groups of values, wherein each respective group of values comprises a plurality of respective values associated with a plurality of respective line items, wherein each value in a respective group of values is associated with a respective line item, and wherein each respective line item has an associated value in at least two groups of values of the plurality of groups of values;
for at least one line item, extract, from the report specification, each respective value from the plurality of groups of values associated with the same respective line item to form a respective line item group, wherein the respective line item group comprises a plurality of values each associated with the same respective line item, and wherein each respective value of the plurality of values is from a different respective group of the groups of values;
apply to at least one line item group an order to the respective values in the respective line item group;
generate an enhanced report specification comprising data that indicates the order applied to the respective values in the respective line item group; and
process the enhanced report specification that includes the at least one line item group, wherein the processor unit executes the computer executable program code for processing the enhanced report specification to:
sequentially iterate through the at least one line item group;
display at least one graphical representation of each of the at least one line item groups one at a time during the sequential iterating, wherein each graphical representation depicts the respective values of the respective line items in the plurality of values of the respective line item group;
determine textual information associated with each of the at least one graphical representations that is indicative of the value of a particular line item within the respective graphical representation, wherein the respective textual information is based at least in part on the order applied to the plurality of values of the respective line item group, and wherein the respective textual information further describes a progression of the respective plurality of values of the respective line item group by describing a difference between the value of the particular line item in the respective line item group and an immediately previous value for an immediately previous line item in the applied order for the respective line item group;
generate a self-presenting report using a selected output format by locating injected fields within layers capable of conditionally displaying in the self-presenting report, wherein the injected fields contain objects with configurable attributes enabling the objects to self-present content controls and information, and
display the respective textual information simultaneously with each of the at least one graphical representations that is indicative of the respective plurality of values of the respective line item group.

14. The system of claim 13, wherein the processor unit executes the computer executable program code to direct the system to extract each respective value from the plurality of groups of values associated with the same respective line item to form the respective line item group directs the system to:
add extraction queries into the report specification.

15. The system of claim 13, wherein the processor unit executes directs the system to:
inject ordering queries into the report specification;
rank the respective values in the identified points of interest using predetermined criteria associated with the ordering queries; and
inject fields into the enhanced report specification enabling selective ordering using the ranking.

16. The system of claim 13, wherein the processor unit executes the computer executable program code to direct the system to generate the enhanced report specification directs the system to:
inject a user interface control enabling selective switching between a typical report mode and a self-presenting report mode, wherein responsive to the user interface control, applying a selected pagination mode.

17. The system of claim 13, wherein the processor unit executes the computer executable program code to direct the system to:
generate the self-presenting report using further a selected output format, which directs the system to:
select an output format from one of a static multi-paged format and a single-paged on-demand generation of each page related to an active annotation format.

* * * * *